US010808524B2

(12) United States Patent
Burrafato et al.

(10) Patent No.: US 10,808,524 B2
(45) Date of Patent: Oct. 20, 2020

(54) SYSTEM FOR CABLELESS BIDIRECTIONAL DATA TRANSMISSION IN A WELL FOR THE EXTRACTION OF FORMATION FLUIDS

(71) Applicant: ENI S.p.A., Rome (IT)

(72) Inventors: Sebastiano Burrafato, Rome (IT); Alessandro Puliti, San Donato Milanese (IT); Claudio Molaschi, Crema (IT); Mauro Favaretto, Salzano (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 16/316,520

(22) PCT Filed: Jul. 14, 2017

(86) PCT No.: PCT/IB2017/054279
§ 371 (c)(1),
(2) Date: Jan. 9, 2019

(87) PCT Pub. No.: WO2018/011763
PCT Pub. Date: Jan. 18, 2018

(65) Prior Publication Data
US 2019/0226329 A1    Jul. 25, 2019

(30) Foreign Application Priority Data
Jul. 15, 2016   (IT) .................. 102016000074309

(51) Int. Cl.
*G01V 3/00*    (2006.01)
*E21B 47/13*   (2012.01)
(Continued)

(52) U.S. Cl.
CPC ............... *E21B 47/13* (2020.05); *H04B 1/18* (2013.01); *H04B 3/03* (2013.01); *H04B 3/26* (2013.01)

(58) Field of Classification Search
CPC .... H04B 1/18; H04B 3/03; H04B 3/26; E21B 47/122
(Continued)

(56) References Cited

U.S. PATENT DOCUMENTS 5,128,901 A * 7/1992 Drumheller ............. E21B 47/16
340/854.3
5,520,245 A * 5/1996 Estes ....................... E21B 47/09
166/66
(Continued)

FOREIGN PATENT DOCUMENTS

WO   WO 2009/143409 A2   11/2009
WO   WO 2012/038468 A1    3/2012

OTHER PUBLICATIONS

International Search Report and Written Opinion of the International Searching Authority dated Sep. 8, 2017 in PCT/IB2017/054279 filed Jul. 14, 2017, 10 pages.

*Primary Examiner* — Kerri L McNally
*Assistant Examiner* — Thang D Tran
(74) *Attorney, Agent, or Firm* — Oblon, McClelland, Maier & Neustadt, L.L.P.

(57) ABSTRACT

System for cableless bidirectional data transmission in a well for the extraction of formation fluids comprising: a plurality of rods connected to each other in succession so as to form a rod string, which extends from the surface to the bottom of the well, the rod string being associable with a plurality of sensors configured for continuously detecting a plurality of parameters relating to the fluids circulating in the well and to the rock formation surrounding the well and/or to safety devices or other remote-controlled well instrumentation; a plurality of communication modules applied at predefined distances along the rod string and configured for the transmission of signals from and towards the bottom of (Continued)

the well; each of the communication modules including at least one metal plate.

11 Claims, 7 Drawing Sheets

(51) Int. Cl.
  *H04B 1/18* (2006.01)
  *H04B 3/03* (2006.01)
  *H04B 3/26* (2006.01)
(58) Field of Classification Search
  USPC .................................................. 340/854.6
  See application file for complete search history.

(56) References Cited

U.S. PATENT DOCUMENTS

| | | | | |
|---|---|---|---|---|
| 5,995,449 | A * | 11/1999 | Green | E21B 23/04 367/83 |
| 6,418,792 | B1 * | 7/2002 | Spychalski | G01N 29/2437 367/167 |
| 8,122,955 | B2 * | 2/2012 | Kaminsky | E21B 41/0064 166/256 |
| 2002/0167418 | A1 * | 11/2002 | Goswami | G01V 11/002 340/853.3 |
| 2003/0230893 | A1 * | 12/2003 | Song | E21B 19/086 285/39 |
| 2005/0001735 | A1 | 1/2005 | Hall et al. | |
| 2005/0263340 | A1 * | 12/2005 | Shehab | G01V 1/04 181/121 |
| 2007/0095536 | A1 * | 5/2007 | Vinegar | C10G 9/24 166/302 |
| 2007/0284108 | A1 * | 12/2007 | Roes | E21B 36/04 166/302 |
| 2008/0128134 | A1 * | 6/2008 | Mudunuri | E21B 43/243 166/302 |
| 2008/0315883 | A1 * | 12/2008 | Chemali | G01V 3/28 324/339 |
| 2009/0067288 | A1 * | 3/2009 | Godager | G01V 11/002 367/81 |
| 2009/0090158 | A1 * | 4/2009 | Davidson | C10G 1/008 72/369 |
| 2009/0289808 | A1 * | 11/2009 | Prammer | E21B 17/003 340/853.7 |
| 2011/0006773 | A1 * | 1/2011 | Bittar | E21B 47/02216 324/333 |
| 2012/0274477 | A1 | 11/2012 | Prammer | |
| 2013/0169385 | A1 * | 7/2013 | Chabas | E21B 17/028 333/24 R |
| 2013/0265171 | A1 * | 10/2013 | Hay | E21B 17/003 340/854.4 |
| 2014/0169129 | A1 * | 6/2014 | Orban | G01V 1/40 367/25 |
| 2014/0246237 | A1 | 9/2014 | Prammer | |
| 2014/0312906 | A1 * | 10/2014 | Gold | G01V 3/20 324/334 |
| 2014/0367092 | A1 * | 12/2014 | Roberson | E21B 47/01 166/250.01 |
| 2014/0368350 | A1 * | 12/2014 | Wang | G01V 3/00 340/854.4 |
| 2014/0375467 | A1 * | 12/2014 | Lilly | E21B 47/123 340/854.4 |
| 2015/0337651 | A1 | 11/2015 | Prammer | |
| 2016/0326867 | A1 | 11/2016 | Prammer | |
| 2017/0248009 | A1 * | 8/2017 | Fripp | E21B 34/066 |

\* cited by examiner

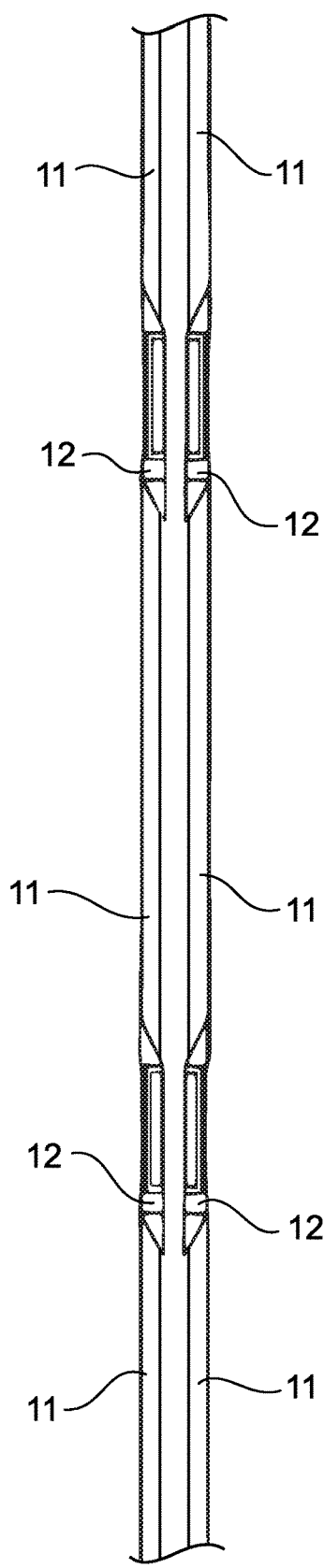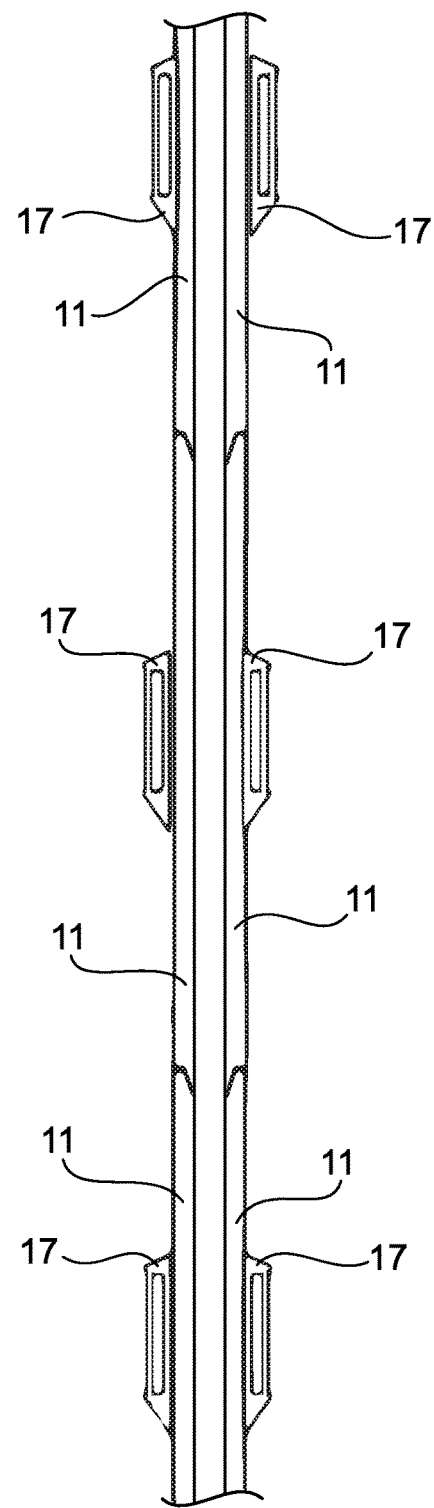
Fig. 2a
Fig. 2b

SYSTEM FOR CABLELESS BIDIRECTIONAL DATA TRANSMISSION IN A WELL FOR THE EXTRACTION OF FORMATION FLUIDS

The present invention refers to a system for cableless bidirectional data transmission in a well for the extraction of formation fluids, for example hydrocarbons.

A well for the extraction of formation fluids can be considered similar to a duct having substantially circular section or, in other words, to a long pipe. Currently there are different known systems for the bidirectional data transmission from and towards the well bottom, more in particular from and towards the well-bottom apparatuses, hereinafter called "downhole tools". The current systems are based mainly on:
- a so-called "mud-pulser" technology, which is based on the transmission of a pressure pulse generated with a defined sequence through the drilling fluid present in the well during all of the drilling operations.
- a so-called "wired pipe" technology, which consists of a particular type of wired rods for which the electrical continuity between contiguous rods is ensured by a contact element placed on the connection threading between the rods themselves. According to this "wired pipe" technology the data is, therefore, transmitted over wired connections.
- a so-called acoustic telemetry technology based on the transmission of sound waves along the drill rods.
- a so-called "through-the-ground" technology based on electromagnetic transmission through the ground.

Each of these technologies has some drawbacks.

"Mud-pulser" technology, indeed, has transmission speed as well as reliability limitations since it may be necessary to transmit the same signal many times before receiving it correctly. The transmission capability of such technology depends on the characteristics of the drilling fluid and on the circulation flow rate of such a fluid.

"Wired pipe" technology suffers from high costs since the wires rods are very expensive; moreover, whenever it is necessary to add a rod to the drill string the wired connection is interrupted, thus preventing the communication from and towards the well bottom during these operations.

Acoustic telemetry technology suffers from potential errors in the transmission due to the operating noise of the bit or to the deviation of the wells from perfectly vertical.

"Through-the-ground" technology, due to the low frequencies used to be able to cover transmission distances of the order of kilometres, suffers from a very low transmission speed (equivalent to that of "mud pulser" technology) and from reliability problems due to passing through many formation layers with different electromagnetic propagation characteristics.

The purpose of the present invention is to avoid the aforementioned drawbacks and in particular to devise a system for bidirectional data transmission in a well for the extraction of formation fluids that is capable of ensuring a large amount of data transmissible in real time and a continuity of the transmission of data from and towards the well bottom, being independent from the operating conditions of the drill string, from the drilling fluid present in a well and from the circulation flow rate of such a fluid.

This and other purposes according to the present invention are accomplished by making a system for bidirectional data transmission in a well for the extraction of formation fluids as outlined in claim 1.

Further characteristics of the system for bidirectional data transmission in a well for the extraction of formation fluids are the object of the dependent claims.

The characteristics and advantages of a system for bidirectional data transmission in a well for the extraction of formation fluids according to the present invention will become clearer from the following description, given as an example and not for limiting purposes, referring to the attached schematic drawings, in which:

FIGS. 2a and 2b are two schematic partial section views of a first and of a second embodiment of a system for bidirectional data transmission according to the present invention;

Figure 3A:
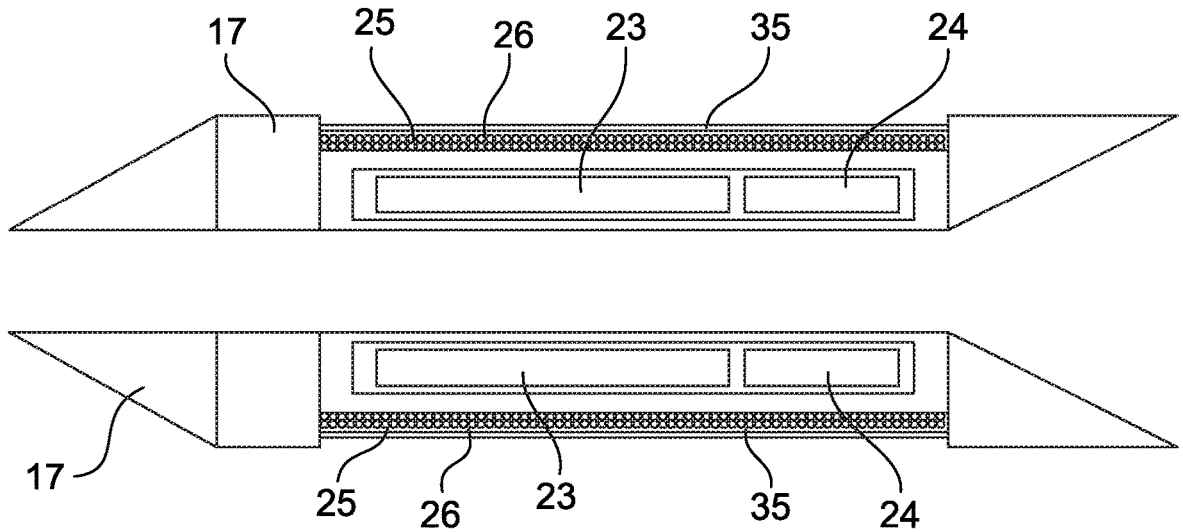
Figure 3B:
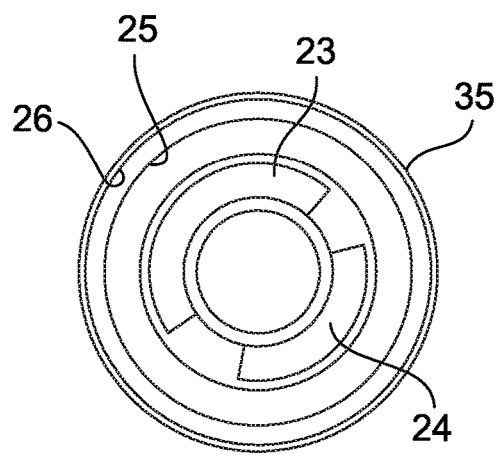
Figure 3C:
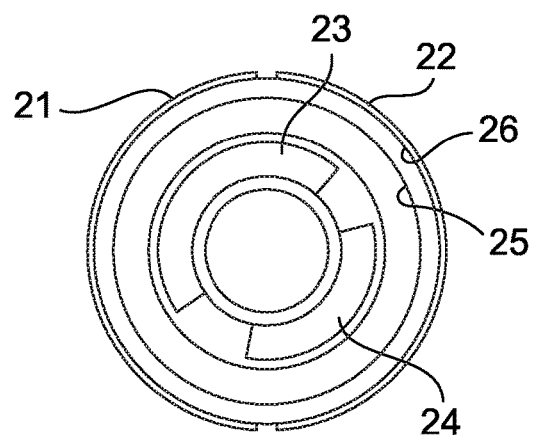
Figure 4A:
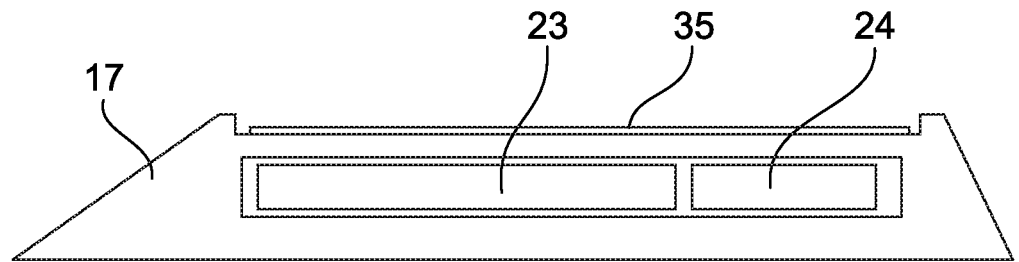
Figure 4A:
Figure 4B:
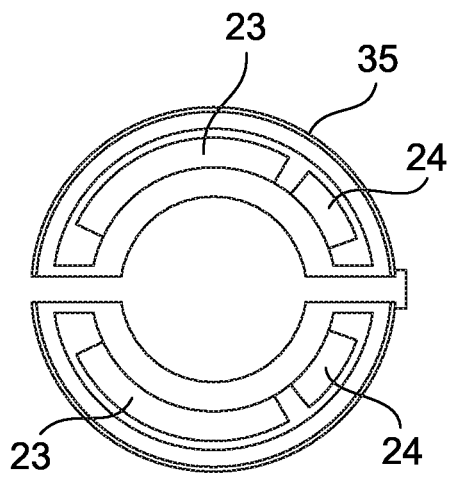
Figure 4C:
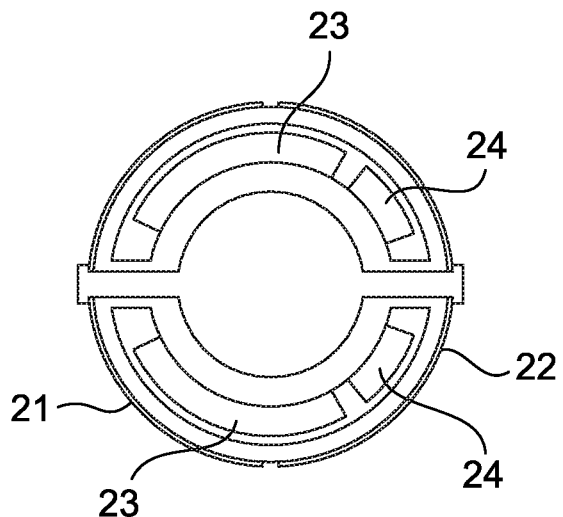
Figure 5:
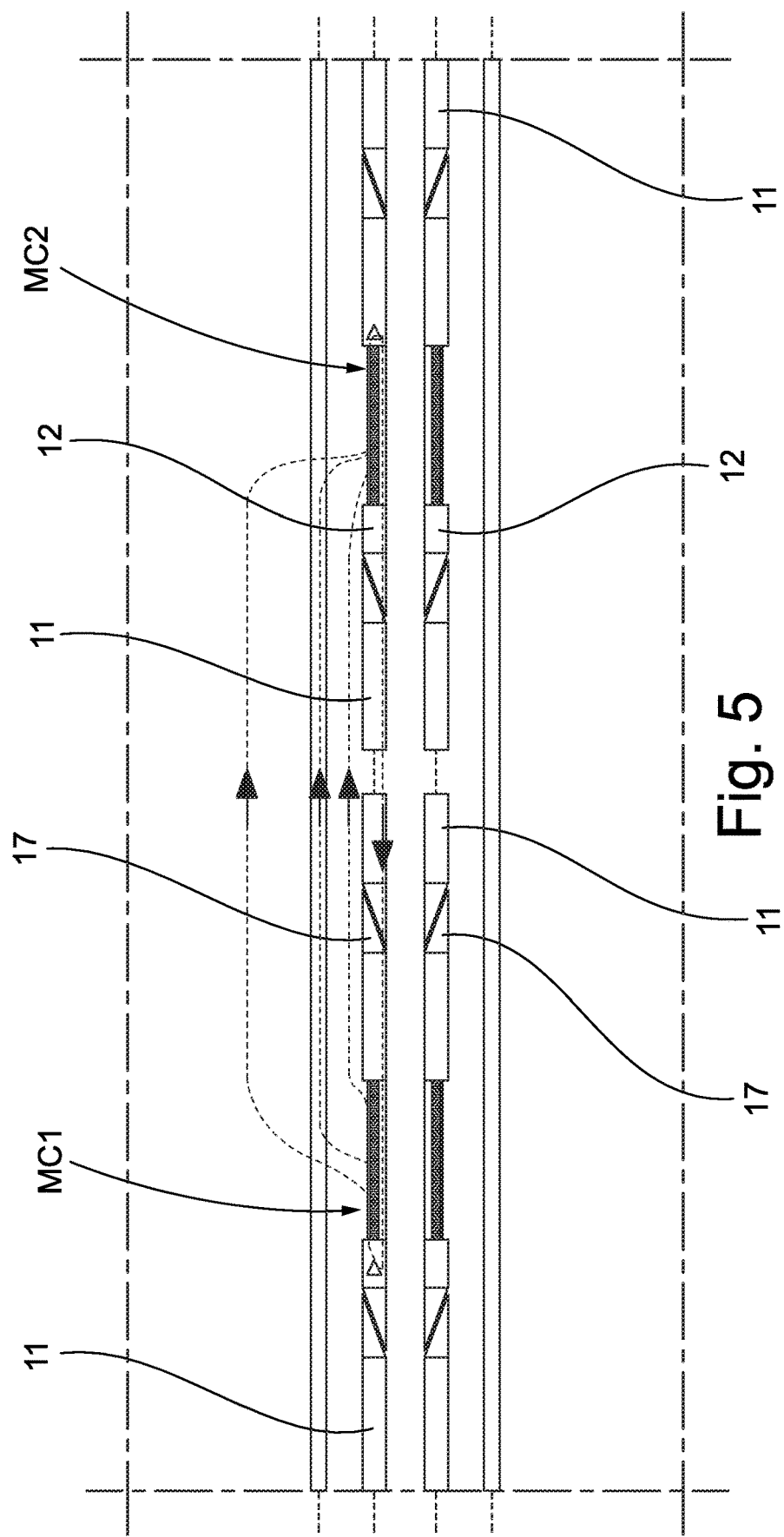
Figure 6A:
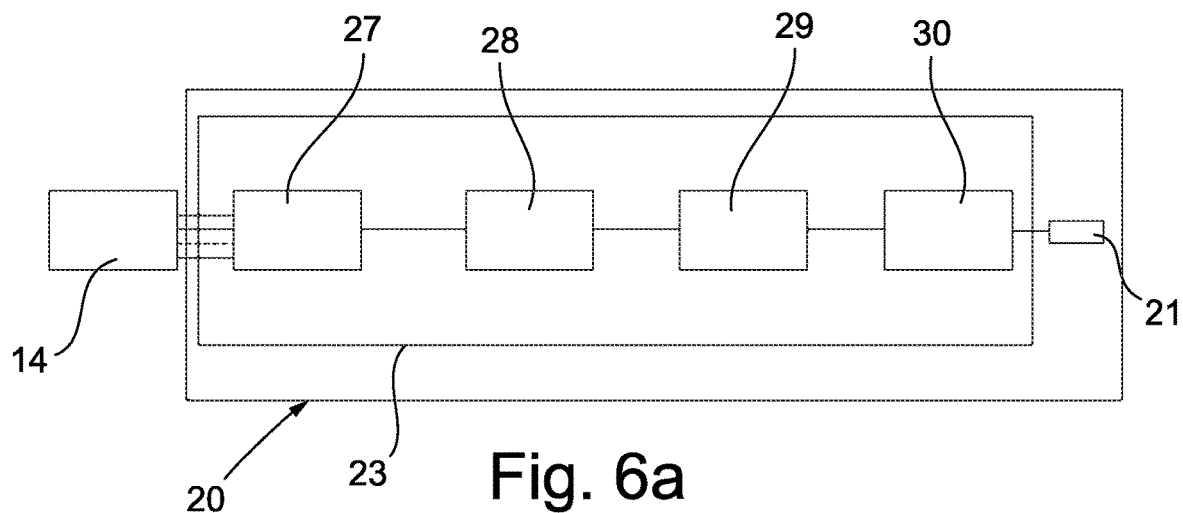
Figure 6B:
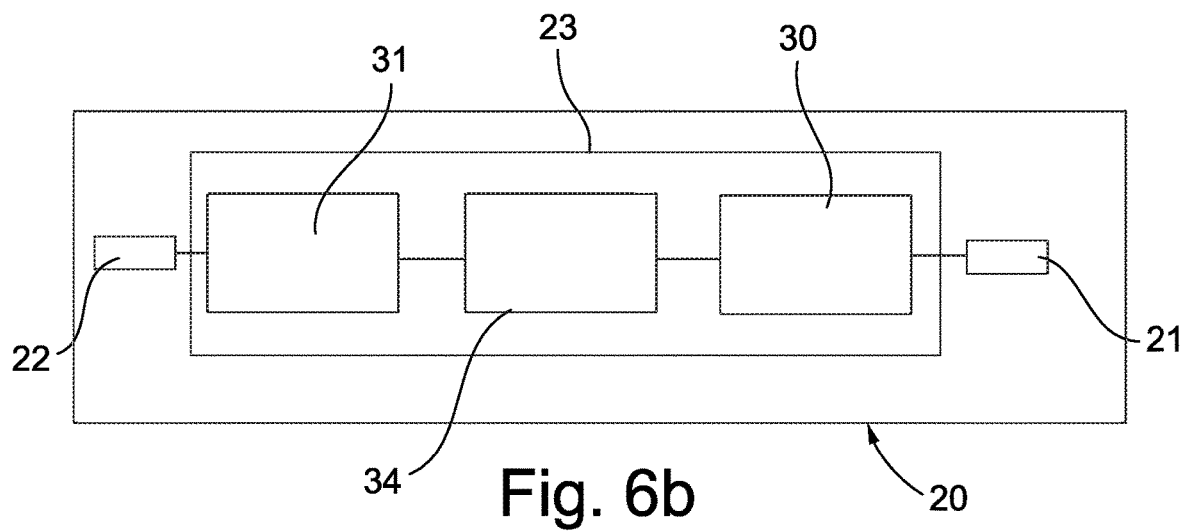
Figure 6C:
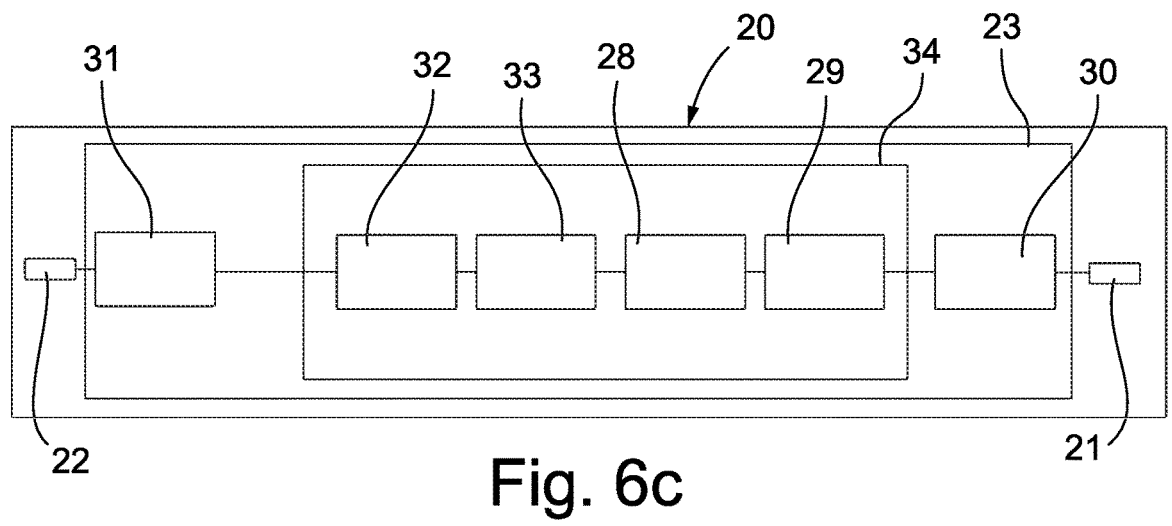
Figure 7:
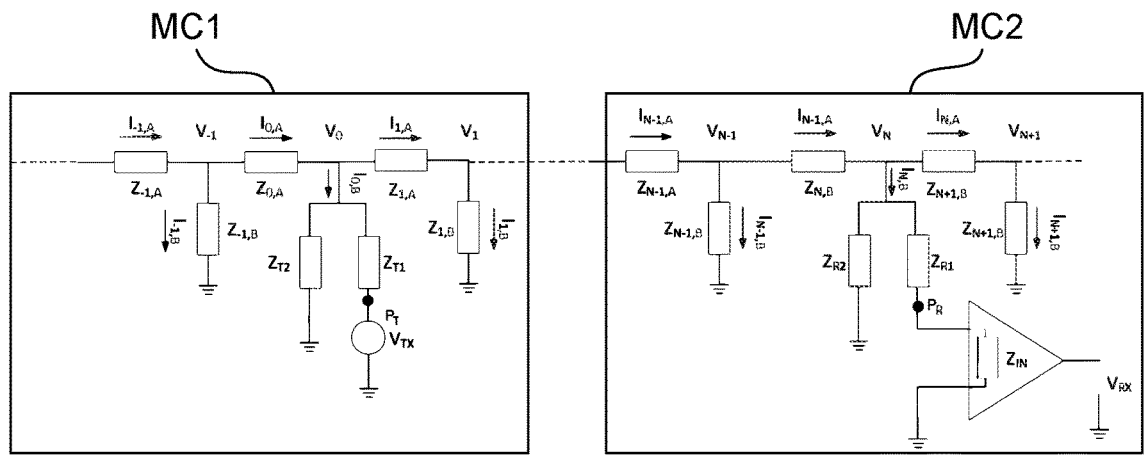
Figure 8:
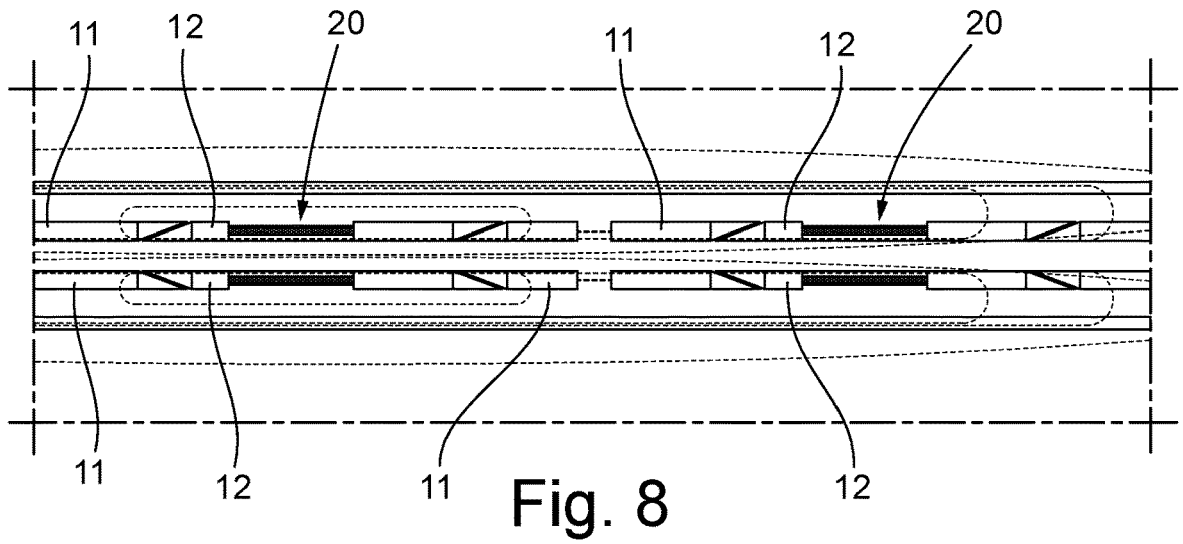
Figure 9:
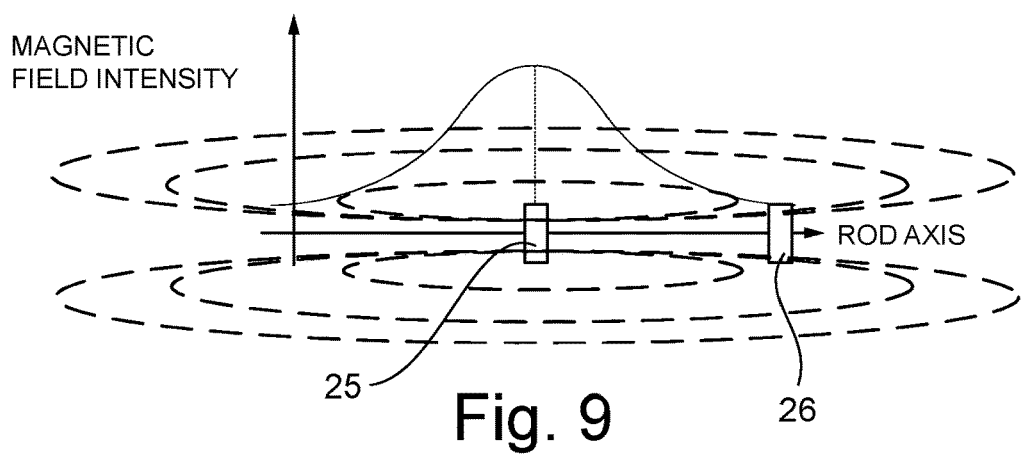

FIGS. 3a and 3b are two schematic views of a first embodiment of a communication module housed in a rod like in FIG. 2a; FIG. 3c is a schematic view of a second embodiment of a communication module housed in a rod like in FIG. 2a; in particular, FIG. 3a is a section view along a plane parallel to the axis of the rod itself, whereas FIGS. 3b and 3c are two section views along a plane perpendicular to the axis of the rod itself;

FIGS. 4a and 4b are two schematic views of a third embodiment of a communication module housed in a protective shell applied to the outer wall of a rod like in FIG. 2b; FIG. 4c is a schematic view of a fourth embodiment of a communication module housed in a rod like in FIG. 2a; in particular, FIG. 4a is a section view along a plane parallel to the axis of the rod itself, whereas FIGS. 4b and 4c are two section views along a plane perpendicular to the axis of the rod itself;

FIG. 5 is a schematic view that represents two communication modules provided with transmitting and receiving metal plates and housed in two rods of a same rod string; FIG. 5 also illustrates examples of current flow lines between the two modules;

FIG. 6a is a block diagram that represents a communication module connected to a plurality of sensors;

FIG. 6b is a block diagram that represents a communication module acting as repeater;

FIG. 6c is a block diagram that represents a communication module acting as regenerator;

FIG. 7 is a circuit diagram that represents a model for the configuration of FIG. 5;

FIG. 8 is a schematic view that represents two communication modules provided with transmitting and receiving coils and housed in two rods of a same rod string; FIG. 8 also illustrates examples of magnetic field flow lines between the two modules;

FIG. 9 is a graph that represents the distribution of the intensity of the magnetic field between two communication modules like those of FIG. 8.

Figure 1:
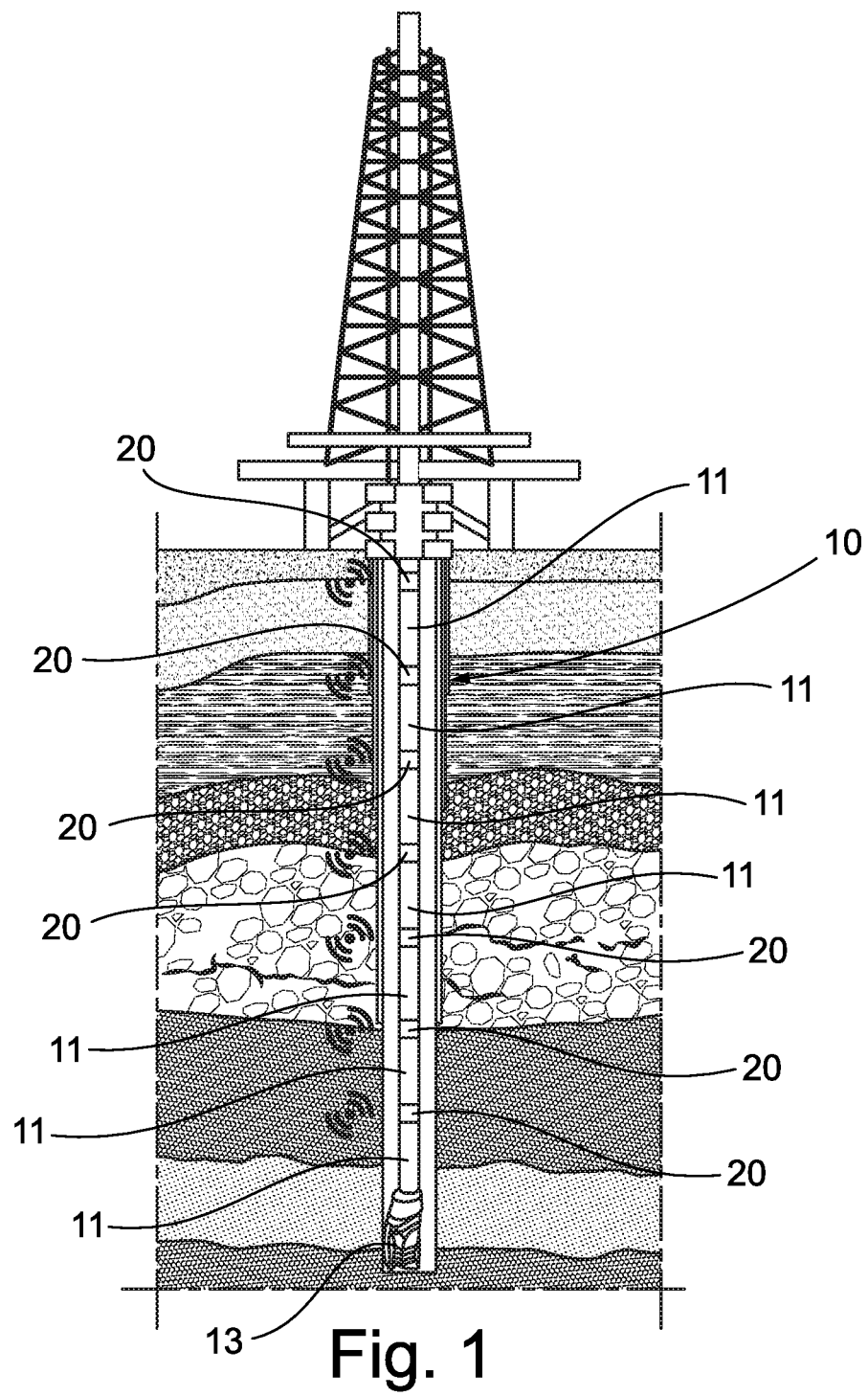
FIG. 1 is a schematic view of a drilling installation for the extraction of hydrocarbons comprising a system for bidirectional data transmission according to the present invention.

With reference in particular to FIG. 1, a generic well for the extraction of formation fluids, like for example hydrocarbons, is shown schematically. The well is wholly indicated with reference numeral 10.

The well 10 is obtained through a drilling installation by exploiting a system for bidirectional data transmission in well according to the present invention. Such a system for bidirectional data transmission comprises a plurality of rods 11, 12 connected to each other in succession so as to form a rod string, which extends from the surface to the bottom of the well 10.

The rod string can be a drill string or even a completion string used during the production steps of the well 10.

The plurality of rods 11, 12 can comprise a plurality of drill or completion rods 11 and a plurality of connecting or interconnection rods 12, also called Telemetry Sub having a shorter length than that of the drill or completion rods 11.

The connecting rods 12 are positioned along the rod string between two drill or completion rods 11 at predetermined intervals of one or more drill or completion rods 11.

Preferably, the Telemetry Subs 12 are positioned along the rod string at intervals of three drill or completion rods. In this case the groups of three drill or completion rods interconnected with each other are commonly called stand.

The rods 11, 12 can be hollow and of substantially circular section. A bit 13 or other digging or drilling tool can be connected to the lower end of the rod string.

The rod string is associable with a plurality of sensors 14, so-called MWD ("Measurement While Drilling"), which can be positioned along the string and in particular at the bottom of the well 10. Such MWD sensors 14 are configured for continuously detecting a plurality of parameters relating to the fluids circulating in the well and to the rock formation surrounding the well 10. These MWD sensors 14 can for example be density or resistivity sensors configured to continuously measure, respectively, the value of the density and the value of the resistivity of the drilling fluid and so on. The rod string can, moreover, be associated with safety devices or other remote controlled well instrumentation (not illustrated).

The system for bidirectional data transmission in a well 10 for the extraction of formation fluids comprises a plurality of communication modules 20 positioned at predefined distances along the rod string and configured for the transmission of signals from and towards the bottom of the well.

Preferably, the distance between two communication modules 20 along the rod string is comprised between 1 and 100 m.

Preferably, the communication modules 20 can be housed inside compartments formed on respective rods 11, 12 as illustrated in FIG. 2a.

In the case in which the rod string comprises drill or completion rods 11 and connecting or interconnection rods 12, the communication modules 20 are preferably housed inside compartments formed in the connecting or interconnection rods 12.

Alternatively, the communication modules 20 can be housed inside compartments in protection shells 17 applied to the outer walls of the rods 11 as illustrated in FIG. 2b.

According to the present invention, each communication module 20 comprises:
- at least one metal plate 21, 22, 35 selected from:
  - a transmitting metal plate 21;
  - a receiving metal plate 22;
  - a transceiver metal plate 35;
- an electronic processing and control unit 23, for example comprising a microprocessor, configured for processing signals to be transmitted by means of the at least one metal plate 21, 35 or signals received by means of the at least one metal plate 22, 35;
- one or more supply batteries 24 to feeding the metal plates 21, 22, 35 and the electronic processing and control unit 23.

Advantageously, in each communication module 20 the metal plates 21, 22, 35 are electrically isolated from the metallic body of the rods 11, 12 or of the protection shells 17 to which the respective communication modules 20 are applied.

In this way, an electrical contact between the metal plates 21, 22, 35 and the metallic body of the rods 11, 12 is avoided.

Preferably, the metal plates 21, 22, 35 are arc-shaped. In a particular embodiment of the present invention each communication module 20 comprises two transmitting metal plates 21 and/or two receiving metal plates 22.

In the case in which the communication module 20 comprises a transceiver metal plate 35 the receiving and transmitting operations, even if simultaneous, are carried out in suitably separate frequency bands. This makes it possible, for the same space occupied, to increase the size of the plate, improving the efficiency in transmission and in receiving.

In addition to the at least one metal plate 21, 22, 35, as illustrated in FIGS. 3a, 3b and 3c, each communication module 20 can comprise at least one transmitting coil 25 and at least one receiving coil 26 coaxial with respect to each other and coaxial with respect to the longitudinal axis of the rod 11, 12 with which they are associated.

In detail, the at least one transmitting coil 25 has few turns, for example of the order of tens, and a conductor of large diameter, for example greater than 1 mm, in order to maximise the current that flows through the conductor itself and therefore the magnetic field proportional thereto and to minimise the dissipation of power.

The at least one receiving coil 26, on the other hand, has a large number of turns, for example of the order of a few thousand, to contain the gain of the signal amplification within practical reachable limits and improve the performance of the amplification.

Preferably, the at least one transmitting coil 25 and the at least one receiving coil 26 are superimposed with respect to each other, as illustrated in FIGS. 3a, 3b and 3c, to contain the space occupied along the longitudinal axis of the rod 11, 12 with which they are associated.

The communication between two successive communication modules 20 of the transmission system can, therefore, take place using the electric current injected in the mud by the transmitting metal plate 21 or transceiver metal plate 35 of a module and captured by the receiving metal plate 22 or transceiver metal plate 35 of the next module, and/or a magnetic field generated by the coil 25 of a module and concatenated by the coil 26 of the next module.

In any case, the communication modules 20 can be configured to act as transmitters and/or receivers and/or repeaters and/or regenerators.

In particular, in the case in which the single communication module 20 is configured to act as signal transmitter, for example like in FIG. 6a, the electronic processing and control unit 23 is configured to acquire and process the detection data from the sensors 14 or the control signals for the safety devices and the other downhole tools. In this case, the electronic processing and control unit 23 comprises a data acquisition module 27 that is configured to create data packets to be transmitted, an encoding module 28 to encode such data packets, modulation circuits 29 for modulating the signals corresponding to the encoded data packets and output amplification circuits 30 for amplifying the modulated signals and feeding the transmitting metal plate 21 or transceiver metal plate 35 and/or the transmitting coil 25.

Correspondingly, in a communication module 20 configured to act as signal receiver the electronic processing and control unit 23 comprises an input amplification circuits 31 for amplifying the signal received by the receiving metal plate 22 or transceiver metal plate 35 and/or by the receiving coil 26, demodulation circuits 32 of such a received and amplified signal and a decoding module 33 of the demodulated signal.

In a communication module 20 configured to act as signal repeater like for example in FIG. 6b the electronic processing and control unit 23 comprises input amplification circuits 31 for amplifying the signal received by the receiving metal plate 22 or transceiver metal plate 35 or by the receiving coil 26, circuits for remodulating 34 the signal to be retransmitted at a different carrier frequency with respect to that of the signal received and output amplification circuits 30 for amplifying the remodulated signal. This modification of the carrier, carried out in an analogue manner, becomes necessary to avoid the communication module 20 suffering from the phenomenon of crosstalk creating inevitable problems in the transfer of information.

In a communication module 20 configured to act as signal regenerator like for example in FIG. 6c the electronic processing and control unit 23 comprises input amplification circuits 31 for amplifying the signal received by the receiving metal plate 22 or transceiver metal plate 35 or by the receiving coil 26, demodulation circuits of such a received and amplified signal, a decoding module 33 of the demodulated signal, an encoding module 28 of the signal previously decoded, modulation circuits 29 for remodulating the signal to be retransmitted at a different carrier frequency with respect to that of the received signal (to avoid the communication module 20 suffering from the crosstalk phenomenon creating inevitable problems in the transfer of information) and output amplification circuits 30 for amplifying the remodulated signal.

In detail, the data to be transmitted is organised in packets of variable length, for example between 10 bit and 100 kbit. Every data packet can, for example, undergo a source encoding process for the compression of the data and/or a channel encoding process to decrease the probability of error. The modulation circuits 29 transform the signal data packet into a suitable signal with characteristics suitable for transmission inside the well 10.

An example of modulation used is DQPSK (Differential Quadrature Phase Shift Keying), according to which a sinusoidal signal is generated with a certain carrier frequency f, for example comprised between 1 and 30 kHz, the phase of which varies according to the value of each sequence of length 2 bit; the phase can thus take on four values, for example ($\pi/4$, $3/4\pi$, $-\pi/4$, $-3/4\pi$). Each pair of bits can be mapped in the absolute phase of the sinusoid or in the relative phase shift (Differential QPSK) with respect to the sinusoid corresponding to the previous pair of bits. The latter choice is preferable because it makes the inverse demodulation process simpler in the next communication module, since it will not be necessary to estimate the exact value of the frequency f since the error introduced by the lacking estimation can be eliminated through techniques known in the field. The waveform can also be filtered with a suitable root-raised cosine (rrcos) frequency filter to limit the band occupancy of the signal at the same rate of transmission.

The modulated voltage signal thus obtained is amplified at voltages with values comprised, for example, between 1 and 100 V by the output amplification circuits 30 capable of supplying the current, with peak values for example comprised between 0.1 and 10 A.

The input amplification circuits 31 of the next communication module 20 transform the current that flows through the receiving metal plate 22 or transceiver metal plate 35 into a voltage signal with peak values of a few volts; moreover, these input amplification circuits 31 adapt the impedance of the receiving metal plate 22 or transceiver metal plate 35 preventing the voltage in input to the next device from being attenuated by "splitting" effect.

In order to explain the transmission method implemented through the metal plates 21, 22, 35 let us consider the example case of the transmission by a first communication module 20 MC1, comprising a transmitting metal plate 21, to a second communication module 20 MC2, comprising a receiving metal plate 22 like in the case illustrated in FIG. 5. The considerations referring to this configuration can apply to the case of the transmission between two transceiver metal plates 35 or between a transmitting metal plate 21 and a transceiver metal plate 35. The configuration of FIG. 5 is schematised by the electrical diagram illustrated in FIG. 7 where the following is considered:

the ground reference is given by the metallic body, typically made of steel, of the rods 11, 12 that in the diagram are considered to be ideal conductors;

Vi indicates an electrical potential that varies along the longitudinal axis of the well 10;

Ii indicates an electric current that varies along the longitudinal axis of the well 10;

V0 indicates the electrical potential produced by a transmitting metal plate 21;

Zi,A indicates an infinitesimal "longitudinal" electrical impedance that opposes the current that flows in the longitudinal direction, i.e. parallel to the longitudinal axis of the well 10;

Zi,B indicates an infinitesimal "radial" electrical impedance that opposes the flow that goes in the radial direction, i.e. perpendicular to the longitudinal axis of the well 10.

In detail, it is possible to consider that Zi,A=zi,AdL and Zi,B=zi,B/dL where:

dL is the physical length of the infinitesimal section to which Zi,A and Zi,B respectively refer; and Zi,A and Zi,B are the "specific impedances" per unit length of the rod-plate assembly that depend on the geometry and on the corresponding specific electrical parameters (conductivity, dielectric constant) of such an assembly.

The transmitting metal plate 21 of the first module MC1 injects a variable electric current modulated by the information signals that carry the data to be transmitted into the fluid, which surrounds the rod string.

The current flows through the fluid, through the casing, if it is present, and through the rock formation surrounding the well 10 to then go back to the ground reference of the transmitting metal plate 21 through the steel of the rod 11, 12 with which the plate is associated.

A part of such a current reaches the receiving metal plate 22 of the second communication module MC2. Such a current is amplified and then acquired by the electronic processing and control unit to extract the information contained in it or directly re-amplified to be retransmitted to a third communication module.

In the electrical diagram of FIG. 7, the electronic processing and control unit of the first communication module MC1 is represented by a generator of voltage of amplitude VTX whereas the transmitting metal plate 21 is represented by the node PT. The generator of voltage of amplitude VTX, through the transmitting metal plate PT, couples with a part of fluid above; such a coupling is modelled with the impedance ZT1. This part of fluid also has an impedance ZT2 that shunts part of the current generated by the transmitting metal plate towards the ground or towards the metallic body of the rod to which the transmitting metal plate 21 is applied.

The receiving metal plate of the second communication module MC2 is represented in the electrical diagram of FIG. 7 by the node PR; such a receiving metal plate 22 couples with the part of fluid above; such a coupling is modelled with the impedance ZR1. This part of fluid also has an impedance ZR2 that derives part of the current close to the receiving metal plate towards the ground or towards the metallic body of the rod to which the receiving metal plate 22 is applied. In turn, the receiving metal plate is connected to the electronic processing and control unit of the second communication module, schematised, in particular, as a low-impedance input current amplifier ZIN (approximable to zero) which in fact amplifies the current signal that passes through the receiving metal plate obtaining a voltage signal VRX containing the information received.

In the case in which the transmitting metal plates 21 and receiving metal plates 22 are cylindrical arc-shaped the efficiency of the coupling of the plates themselves with the fluid surrounding the rod string depends substantially on the length of the longitudinal part of such an arc and on the angle described by the arc. The greater such a length is and the closer the angle is to 360°, the greater the efficiency of the aforementioned coupling will be.

Preferably, in the case in which the communication module 20 in addition to the metal plates 21, 22, 35 also comprises the transmitting and receiving coils, the cylindrical arc does not have to describe a complete angle of 360° to avoid parasitic currents induced on the metal plates 21, 22, 35 during the excitation of the coils.

As far as the transmission of the signals between two communication modules through the transmitting and receiving coils 25, 26 is concerned, let us consider as an example the schematic views of FIGS. 8 and 9. In particular, FIG. 9 represents the magnetic field lines generated by a transmitting coil 25 and concatenated with a receiving coil 26.

As can be observed, the arrangement of the coils in a configuration coaxial to the rods 11, 12 of the rod string makes it possible to maximise the magnetic field flux that is concatenated with the receiving coil 26. Indeed, the receiving coil 26 substantially encloses the entire circumferential extension of the rod 11, 12 made of ferromagnetic steel in which a large amount of the magnetic field flux is confined. The useful signal at the terminals of the receiving coil 26 thus contains the contributions of all of the distribution of magnetic field generated by the transmitting coil 25 from the position of the receiving coil onwards.

From the description that has been made the characteristics of the system for bidirectional data transmission in a well for the extraction of formation fluids object of the present invention are clear, just as the relative advantages are also clear.

The transmission towards the surface of the detections of the sensors distributed in the well takes place safely, cheaply and substantially in real time allowing continuous real time monitoring of the well bottom parameters, and thus allowing safety to be increased during drilling thanks to the possibility of intervening immediately in the case of detection of anomalies and shifts from the foreseen parameters.

Indeed, through the management and analysis of the data in real time, it is possible to immediately identify the change of the formations crossed and the shifts of the trajectory of the well with respect to the plan, allowing operative decisions to be taken faster and allowing intervention with corrective actions.

The transmission system, according to the present invention, also makes it possible to have all the well bottom data even during the well control steps, in which the Blow Out Preventer (BOP) is closed, or during all of the applications of managed pressure drilling.

The data is transmitted continuously even in the presence of losses of circulation. There is no longer the need to slow down the operations to impart the commands to the automatic well bottom apparatuses to set or correct the drilling trajectory. The ability to transmit large volumes of data, keeping high drilling advancement speeds, makes it possible to send the log while drilling measurements to the surface in real time with a definition higher than the current standard, with the possibility of definitively replacing the current wireline logs.

The possibility of having sensors along the entire drill string allows continuous monitoring along the entire axis of the well of parameters like pressure, temperature, tension and compression loads, torsion and bending. This for example makes it possible to effectively prevent and resolve events of string jamming, washout identification, etc.

The field of application refers mainly to the drilling step of an oil well but this does not rule out use also during the production step. Indeed, this data transmission system can be integrated both inside a drill string and inside a completion string and in any case in all situations in which it is possible to transmit or receive data from the well bottom or from intermediate points along the pipe.

Finally, it is clear that the system for bidirectional data transmission in a well for the extraction of formation fluids thus conceived can undergo numerous modifications and variants, all of which are covered by the invention; moreover, all of the details can be replaced by technically equivalent elements. In practice, the materials used, as well as the sizes, can be whatever according to the technical requirements.

Finally, the application of such a data transmission method should be considered able to be extended both to onshore and offshore wells.

The invention claimed is:

1. A system for cableless bidirectional data transmission in a well for the extraction of formation fluids comprising:
   a plurality of rods connected to each other in succession so as to form a rod string, which extends from the surface to the bottom of said well,
   said rod string is associated with a plurality of sensors configured for continuously detecting a plurality of parameters relating to the fluids circulating in the well and to the rock formation surrounding the well and/or to safety devices or other remote-controlled well instrumentation;
   a plurality of communication modules applied at predefined distances along said rod string and configured for the transmission of signals from and towards the bottom of the well;
   each of said communication modules comprising:
   at least one metal plate selected from:
   a transmitting metal plate;
   a receiving metal plate;
   a transceiver metal plate;
   an electronic processing and control unit configured for processing signals to be transmitted by said at least one metal plate or signals received by said at least one metal plate;
   one or more supply batteries for feeding said metal plates and said electronic processing and control unit, wherein the transmission of the signal to be transmitted from a first communication module of the plurality of communication modules to a second module of the plurality of communication modules occurs by injecting into the fluid surrounding the rod string, by the at least one metal plate of the first communication module, an electric current that carries an information signal, at least a part of the injected electric current, that has propagated through at least the fluid, being received by the at least one metal plate of the second communication module.

2. The system according to claim 1, wherein each of said communication modules comprises two transmitting metal plates and/or two receiving metal plates.

3. The system according to claim 1, wherein each of said communication modules comprises at least one transmitting coil and at least one receiving coil coaxial with respect to each other and coaxial with respect to the longitudinal axis of said rod string.

4. The system according to claim 3, wherein said at least one transmitting coil and said at least one receiving coil are superimposed with respect to each other.

5. The system according to claim 1, wherein said communication modules are housed in compartments obtained on respective rods.

6. The system according to claim 5, wherein said plurality of rods comprises a plurality of drill or completion rods and a plurality of connecting or interconnection rods having a shorter length than that of said drill or completion rods, said communication modules being housed in compartments obtained on said connecting or interconnection rods.

7. The system according to claim 1, wherein said communication modules are housed in protection shells applied to the outer walls of said rods.

8. The system according to claim 7, wherein said transmitting metal plates and receiving metal plates are arc-shaped.

9. The system according to claim 1, wherein, in each of said communication modules, said metal plates are electrically isolated from the metallic body of the respective rods.

10. The system according to claim 1, wherein the distance between two communication modules along said rod string ranges from 1 to 100 m.

11. A method for cableless bidirectional data transmission in a well for the extraction of formation fluids comprising the following steps:
arranging in succession a plurality of rods connected to each other so as to form a rod string, which extends from the surface to the bottom of the well;
associating the rod string with a plurality of sensors configured for continuously detecting a plurality of parameters relating to the fluids circulating in the well and to the rock formation surrounding the well and/or to safety devices or other remote-controlled well instrumentation;
applying a plurality of communication modules at pre-defined distances
along said rod string, the communication modules being configured for the transmission of signals from and towards the bottom of the well, each of said communication modules comprising:
at least one metal plate selected from:
a transmitting metal plate;
a receiving metal plate;
a transceiver metal plate;
arranging an electronic processing and control unit configured for processing signals to be transmitted by the at least one metal plate or signals received by the at least one metal plate:
arranging one or more supply batteries for feeding the metal plates and the electronic processing and control unit;
injecting into the fluid surrounding the rod string, by at least one metal plate of a first communication module (MC1), an electric current that carries an information signal;
receiving, by at least one metal plate of a second communication module (MC2), at least a part of said injected electric current that has propagated through at least said fluid.

* * * * *